United States Patent
Weik et al.

(10) Patent No.: US 8,811,589 B2
(45) Date of Patent: Aug. 19, 2014

(54) METHOD TO PROVIDE AN OPERATOR SELECTION SERVICE AS WELL AS A COMMUNICATIONS NETWORK AND A CALL SERVER THEREFORE

(75) Inventors: Hartmut Weik, Stuttgart (DE); Uwe Stahl, Leonberg (DE)

(73) Assignee: Alcatel Lucent, Paris (FR)

( * ) Notice: Subject to any disclaimer, the term of this patent is extended or adjusted under 35 U.S.C. 154(b) by 1619 days.

(21) Appl. No.: 11/686,674

(22) Filed: Mar. 15, 2007

(65) Prior Publication Data

US 2007/0153992 A1    Jul. 5, 2007

Related U.S. Application Data

(62) Division of application No. 10/685,514, filed on Oct. 16, 2003, now Pat. No. 7,260,206.

(30) Foreign Application Priority Data

Oct. 29, 2002 (EP) .................................... 02360301

(51) Int. Cl.
*H04M 7/00* (2006.01)
*H04M 3/00* (2006.01)

(52) U.S. Cl.
USPC .................. 379/220.01; 379/221.14; 379/243

(58) Field of Classification Search
USPC ............................... 379/219, 220.01, 221.01, 379/221.08–221.1, 221.15, 229, 230
See application file for complete search history.

(56) References Cited

U.S. PATENT DOCUMENTS

| | | | | |
|---|---|---|---|---|
| 5,903,639 | A * | 5/1999 | Lipchock et al. | 379/221.08 |
| 6,130,941 | A * | 10/2000 | Nimmagadda et al. | 379/230 |
| 6,442,267 | B2 * | 8/2002 | Culli et al. | 379/220.01 |
| 6,680,922 | B1 | 1/2004 | Jorgensen | |
| 7,200,150 | B2 * | 4/2007 | Lewis | 370/352 |

OTHER PUBLICATIONS

Public Communication Network Group: "Information, System Description D900/D1800, A30808-X3231-X44-1-7618" 1997, Siemens AG, Munich, Germany XP002227573.

* cited by examiner

*Primary Examiner* — Ahmad Matar
*Assistant Examiner* — Nafiz E Hoque
(74) *Attorney, Agent, or Firm* — Harness, Dickey & Pierce

(57) ABSTRACT

The invention relates to a method to provide an operator selection service for subscribers of a communications network (CN'), wherein the subscribers terminals (T1, T2, ..., Tn) are connected to one local exchange (ILEX) of a first operator, wherein said local exchange (ILEX) detects, whether call handling of an incoming call request is to be performed within network devices of said first operator or to be passed to a second operator, wherein, if a call is to be passed to the second operator, the local exchange (ILEX) identifies the calling address and the called address and sends a call information (M1) comprising said addresses to a call server (LS1, LS2) of the second operator, the call server (LS1, LS2) sends back a connection request (M2) to establish a call connection between selected terminals (T1, T2, ..., Tn) over a determined fixed connection (TC1, TC2) connecting an outgoing trunk (X1, Y1) and an incoming trunk (X2, Y2) of said local exchange (ILEX) and the local exchange (ILEX) establishes the requested call connection over said determined connection (TC1, TC2), and also to a communications network (CN') and a call server (LS1, LS2) therefore.

2 Claims, 3 Drawing Sheets

METHOD TO PROVIDE AN OPERATOR SELECTION SERVICE AS WELL AS A COMMUNICATIONS NETWORK AND A CALL SERVER THEREFORE

This is a divisional of U.S. application Ser. No. 10/685,514 filed on Oct. 16, 2003, the above-noted application incorporated herein by reference in its entirety.

BACKGROUND OF THE INVENTION

The invention is based on a priority application EP 02 360 301.2 which is hereby incorporated by reference.

The invention relates to a method to provide an operator selection service for subscribers of a communications network and to a communications network, and a call server.

Traditionally, telephone subscribers of one country or one region of a country were all served by only one national or regional carrier network, further called incumbent carrier.

The terminals of a public telephone network are physically connected to different local exchanges of said incumbent carrier depending on their location. Call connections traditionally are established directly by the local exchange, if both subscribers belong to the same region, i.e. if both subscribers are connected to the same local exchange. In this case a so-called local call is carried out without involving any other exchanges.

Differently, for long distance calls, a connection has to be established over a chain of exchanges, wherein said exchanges are often grouped in hierarchical order. For a long distance call establishment, signalling information has to exchanged between all affected exchanges. In modern telephone networks according to well known Integrated Services Digital Networks (ISDN) standards, said signalling information is exchanged by means of specific protocols over a separate signalling network, forming a so-called signalling system number seven (SS7).

In recent years, national authorities of a plurality of countries decided to open the telecommunication market to competitors. As it is extremely expensive to build up separate networks providing physical access to customer terminals, a solution was chosen, wherein the customer terminals may remain physically connected to local exchanges of the incumbent carrier, but may select different carriers for further call service. This selection may be carried out either on call-by-call basis, wherein for each call the user may select an appropriate carrier by dialling a prefix number, or on pre-selection basis, where each call of a customer is forwarded to the selected carrier by said customer. With this solutions, customers can select competitive carriers different from the incumbent carrier without changing any physical access.

In a lot of countries, carrier selection is already possible for long distance calls, i.e. for calls, that cannot be handled by the local exchange alone. The incumbent carrier, receiving a call request at a local exchange, need to distinguish between calls, that are to be forwarded to further exchanges of his own network and that are to be forwarded to a so-called competitors local exchange.

Legislation in a lot of countries, e.g. in Germany and in France will force to further open the incumbent networks even for local calls. As a variant or a development of a solution used for carrier selection for long distance calls, wherein local exchanges of competitors are connected to local exchanges of incumbent carriers, a solution assumed as prior art solution for enabling local call selection service is shown in FIG. 1.

FIG. 1 shows a connection oriented communications network CN, i.e. a telephone network, comprising by way of example one local exchange ILEX of an incumbent carrier, further called incumbent local exchange ILEX. Further, the communications network CN comprises a local exchange of a competitor, in the following called competitive local exchange CLEX. By way of example, a first port X1 (outgoing port) of the incumbent local exchange ILEX is connected to one port of the competitive local exchange CLEX by an outgoing line OL, and a second port X2 (ingoing port) of the incumbent local exchange ILEX is connected to one further port of the competitive local exchange CLEX by an ingoing line IL. The ingoing and the outgoing line IL and OL each comprise a bundle of a certain number of communication trunks, e.g. one so-called PCM 30 system defined within the framework of ISDN and comprising 30 communication trunks. Further, a number of n terminals T1, T2, ..., Tn is connected to the incumbent local exchange ILEX.

Traditionally, in case of local calls, all of said terminals T1, T2, ..., Tn, e.g. calls between terminal T1 and terminal T2, were served by the incumbent local exchange ILEX and were solely served by said exchange. Here, by way of example, the subscribers have the opportunity to choose between the incumbent operator and a competitive operator, each having installed an own local exchange ILEX and CLEX respectively. If a subscriber e.g. of the first terminal, selects the incumbent operator, he is still served as traditionally. If he selects the competitive operator, the corresponding call needs to be forwarded from the incumbent local exchange ILEX to the competitive local exchange CLEX. Therefore, the incumbent local exchange ILEX, after detecting, that said call has to be transferred to a competitor and identifying the specific competitor, if more that one competitor is existing, sends corresponding call information to the identified competitive local exchange CLEX, normally comprising the calling number and the called number, over the signalling network SS7 to said competitive local exchange CLEX. Here, it is assumed, that the communications network CN represents a so-called integrated services digital network (ISDN), wherein signalling information between the network nodes, i.e. the exchanges ILEX and CLEX in the example of FIG. 1, is transmitted over a separate signalling network SS7, called signalling system (number) 7.

The competitive local exchange CLEX looks up, what service has to be carried out, e.g. to resolve the called number for identifying the physical address of the called subscriber, e.g. the calling number of the terminal T2, if said number represents a number of a so-called private virtual network. The competitive local exchange CLEX then sends back, over the signalling network SS7 a connection request to the incumbent local exchange ILEX to connect the corresponding terminals T1 and T2 to the ingoing line OL1 and to the outgoing line IL respectively. Further, charging the calling subscriber and/or the called subscriber is carried out by the competitive local exchange CLEX.

The provision of a separate local exchange per incumbent exchange area is expensive. Therefore, the above described solution will not be commercial profitable within small local area networks, i.e. for local exchanges with a fairly low number of connected terminals. Thus, local competitors will concentrate on cities of a greater size.

SUMMARY OF THE INVENTION

However, a significant part of the population lives in rural areas. Thus, it is an object of the invention to create a method and means suitable to allow competition within local networks without the need to install additional exchanges.

The basic idea of the invention is that, instead of a connection of a competitors local exchange to a an incumbent local exchange, a competitive operator reserves a defined number of one or more pairs of communication trunks of the incumbent local exchange, physically connecting each of said pairs. The incumbent exchange and a call server of said competitive operator are connected over a signalling network. When a call comes in, the local exchange identifies the calling subscriber number and the called subscriber number and sends a call information comprising said numbers to said call server. The call server evaluates the call information and sends back a connection request to establish a call connection over a determined fixed trunk connections.

Further refinements of the invention are to be found in the dependent claims and in the description below.

BRIEF DESCRIPTION OF THE DRAWINGS

The invention is explained further below with the aid of the accompanying drawings.

DETAILED DESCRIPTION OF THE INVENTION

Figure 1:
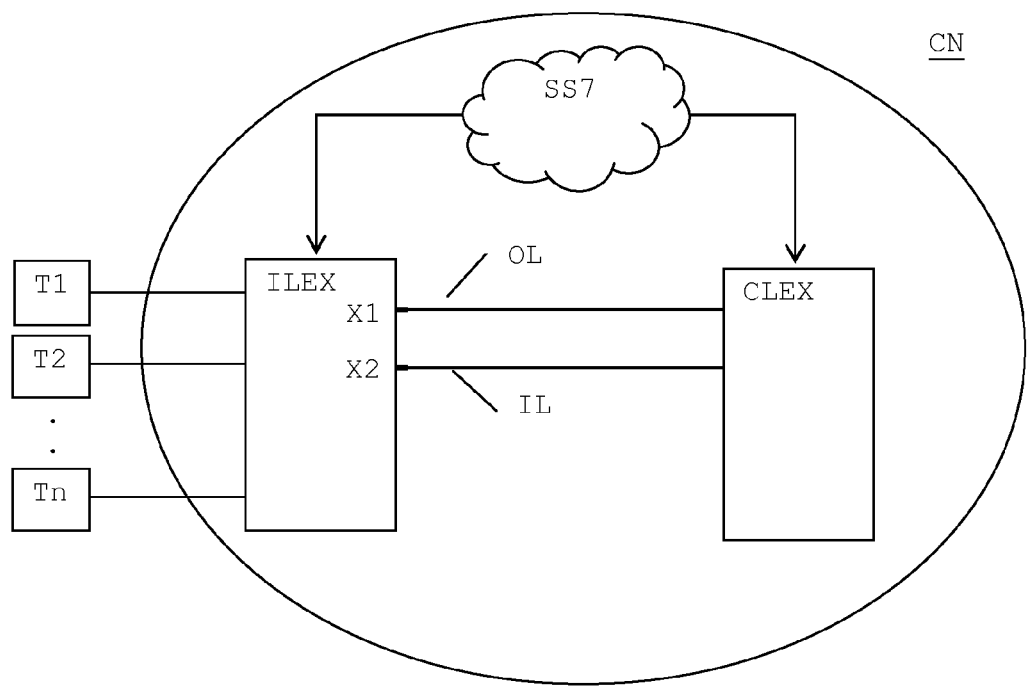
FIG. 1 schematically shows a communications network for local operator selection according to the prior art with an incumbent local exchange and a competitive local exchange and FIG. 2 schematically shows a communications network for local operator selection according to the invention with an incumbent local exchange and a call server according to the invention and FIG. 3 schematically shows an exemplary communication flow local between an incumbent local exchange and a call server according to the invention.

According to the invention, a competitive operator does not need to install any local exchange to physically switch any bearer channels. Such a solution, depicted in FIG. 1, is anyway not useful in a pure technical view, because the additional exchange can not really support the local exchange in switching the bearer channels. Instead of said solution, a call server is provided according to the invention, to perform a kind of soft switching, explained in the following by means of FIG. 2 and FIG. 3.

Figure 2:
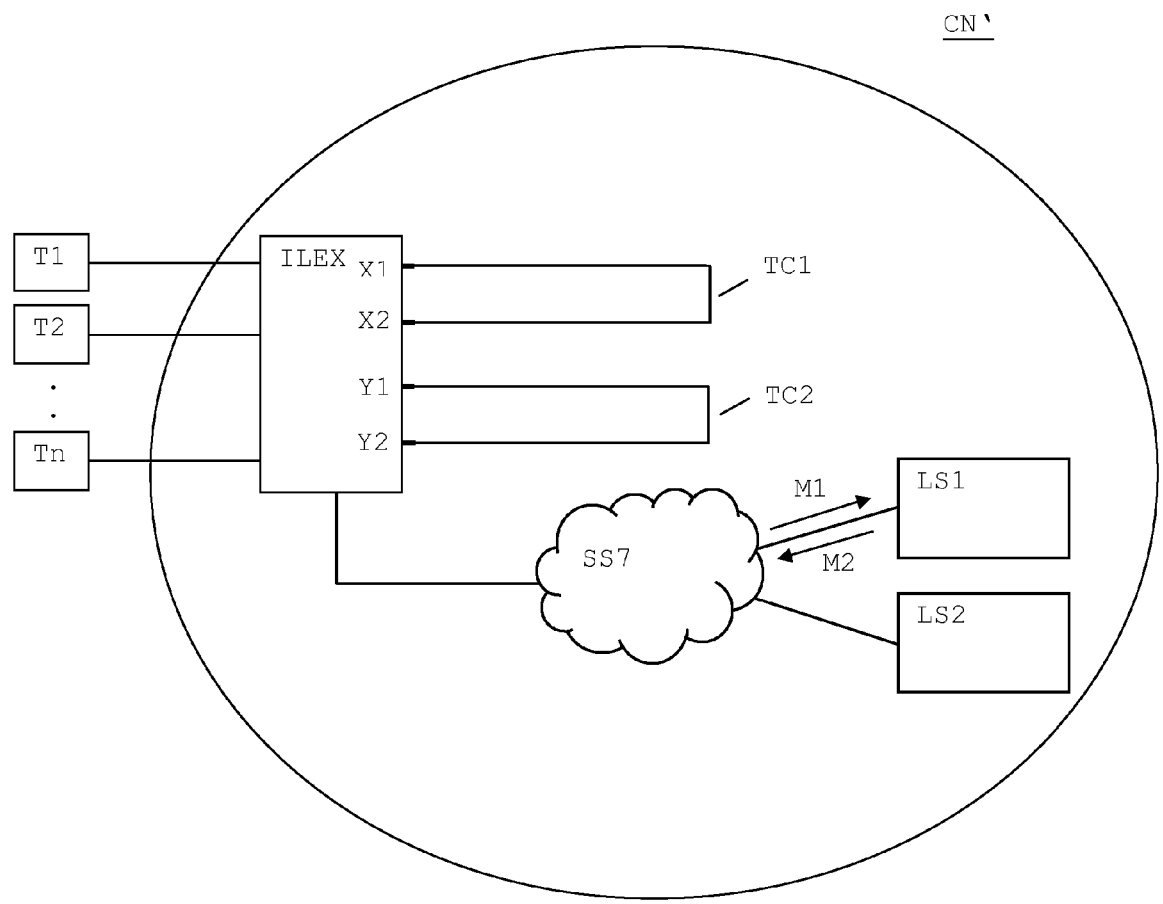

FIG. 2 therefore shows an alternative communications network CN' further called competitive network CN' comprising the same signalling network SS7 and by way of example one and the same incumbent local exchange ILEX of FIG. 1 connecting to the n terminals T1-Tn. Further, the incumbent local exchange ILEX of an incumbent operator is connected by way of example to a first call server or first softswitch LS1 of a first competitive operator and to a second call server or softswitch LS2 of a second competitive operator over said signalling network SS7. Further corresponding to the number of competitive operators, two connection loops TC1 and TC2 are connecting each two ports X1, X2 and Y1, Y2 of the local exchange ILEX respectively. By way of example, signalling messages, i.e. a call information message M1 and a connection request message M2 between the local exchange ILEX and the first softswitch LS1 are depicted symbolised as arrows.

Figure 3:
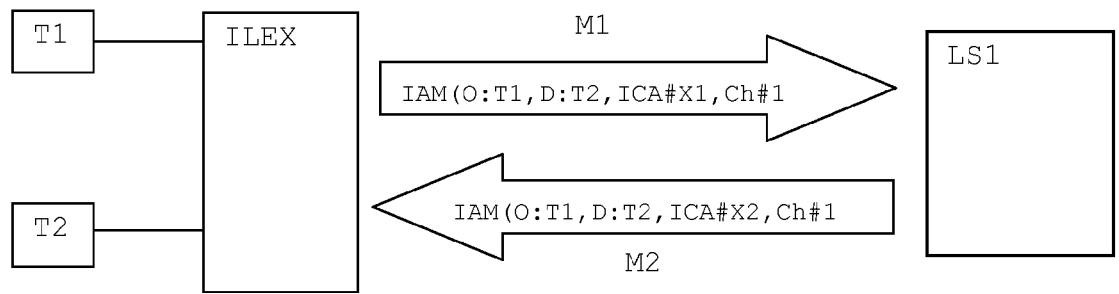

To each softswitch LS1 or LS2 of an alternative operator, a specific connection loop TC1 or TC2 respectively is assigned. If e.g. an incoming call is to be handled by the first softswitch LS1, the incumbent local exchange ILEX sends the call information M1 to said first softswitch LS1 This information includes the communication trunk or channel number of the assigned connection loop TC1, that will be used for the call connection. In the following, the signalling messages M1 and M2 are described in details:

FIG. 3 schematically shows an exemplary information content of each the signalling messages M1 and M2 depicted in FIG. 2. These signalling messages are called Initial Address Messages IAM within the framework of ISDN, defined within Recommendations Q.760-Q.764 of the International Communication Union, Telecommunication Standardization Sector, abbreviated ITU-T, these recommendations dealing with the Signalling System No. 7, ISDN user part signalling procedures.

The call information message M1, sent by the incumbent local exchange ILEX to the first softswitch comprises an originating address O:T1, here the calling number of the calling terminal, a destination address D:T2, here the calling number of the second terminal T2, an interconnection access identification ICA, here the address of the outgoing port X1, and the communication channel or number of trunk of the trunks within said outgoing port X1, here the channel number 1 by way of example.

The connection request message M2, sent as an answer to the call information message M1 by the first softswitch LS1 shows the same structure. Here further, by way of example, the originating address and the destination address are similar. Generally, these addresses can also be different. The interconnection access identification ICA refers to the ingoing port X2, and the communication channel or number of trunk of the trunks within said ingoing port X2 is channel 1 here by way of example.

If one operator, e.g. the operator running the softswitch LS1 only has a connection loop TC1 interconnecting just one ingoing port X1 to just one outgoing port X2 as depicted by way of example in FIG. 2 and in FIG. 3, the interconnection access identification need not to be explicitly exchanged and can be omitted, if allowed by the used protocol structures.

As depicted in FIG. 2, the alternative operators do not provide any direct access for subscriber terminals T1-Tn; all terminals (of the local exchange area) remain connected to the incumbent local exchange ILEX. Thus, the incumbent local exchange ILEX must differentiate between incoming calls depending on the selected operator, the calling subscriber has chosen. For this choice, there exist two alternatives of services:

In a first alternative, called call-by-call service, the calling subscriber has to add a defined prefix address to the destined address of the called terminal, i.e. within existing telephone networks, he has to dial a certain sequence of numbers before dialling the calling number of the called terminal. Different prefix addresses are assigned each to a different operator. The incumbent local exchange needs to analyse the destined address with respect to defined prefix addresses and to send a call information message M1 to the softswitch of the identified operator.

In a second alternative, called pre-selection service, the subscribers have the opportunity to pre-select a certain operator. The incumbent local exchange ILEX needs to have stored, internally or in a separate data base, assignments between (the addresses of) each of the connected terminals T1-Tn and the corresponding selected operator. If subscriber, assigned to a certain operator, initiates a call with a destined address, no difference has to be made depending on the operator. The incumbent local exchange ILEX has to look up his database for retrieving that operator, the calling terminal is assigned to and to send a call information message M1 to the identified operator.

The softswitch of the identified operator, e.g. the first softswitch LS1, receives the call information message M1. The softswitch LS1 has access to a data base, not shown in FIG. 2, storing subscriber data to perform requested services. This data base is looked up, whether a service either for the calling subscriber or for the called subscriber has to be carried out.

As example for a service to calling subscribers, the called address is translated according to predefined rules into a physical address of the called terminal. This service is e.g. used for the provision of virtual private networks mentioned previously. In such virtual networks, the destination addresses represent so-called virtual addresses. Each of these virtual addresses are assigned to one or more physical terminal addresses, e.g. called numbers of telephone terminals. These assignments are stored within the corresponding softswitch or within a data base accessible by said softswitch.

As example for a service for the called subscriber, the called address is changed into a selected physical address of a terminal chosen by the called subscriber. This choice e.g. is made depending on the actual date or time. Alternatively the called subscriber can determine, that all calls have to be forwarded to a selected terminal.

The called subscriber might also have stored a so-called white list of originating addresses, that should exclusively be connected to a certain terminal of the called subscribers choice. Alternatively a black list could contain originating addresses, for which no connection should be established. For the case of an incoming call originated by a subscriber noted on a black list, the softswitch sends an connection information M2 indicating, that the corresponding call is to be terminated.

In a further service for the called subscriber, the corresponding address of his terminal (T2) is replaced by a selected physical address of a further terminal (T3), if the said called terminal (T2) is busy or disconnected.

An important further service carried out by a softswitch according to the invention concerns the charging or billing of calls served by the softswitch. The softswitch therefore collects all necessary call data, e.g. duration of a call the originating subscriber and destined subscriber and charge e.g. the originating subscriber according to predefined and stored rules, depending e.g. on the contract with the corresponding subscriber (e.g. flat rate, fixed price for each call or price depending on the call duration). It is also possible to have stored an indication in the softswitch, that the destined subscriber absorbs the call costs or part of the costs. The softswitch might send all collected call data to as billing server, not shown here, that periodically generates a bill for the subscribers served by said softswitch.

The softswitches LS1 and LS2 are servers comprising hardware with a central processing unit, data storage means (RAM) and program storage means (ROM) and at least an interface to the signalling network SS7. The softswitches can be realised as stand alone servers or can alternatively be integrated into other network devices.

The data base with subscriber information can be integrated within said softswitches LS1 and LS2 or can be realised as separated data bases. Such a data base can be assigned to just one softswitch or to a plurality of different softswitches.

A softswitch LS1 or LS2 can be assigned to just one local exchange ILEX or to a plurality of different local exchanges. It can be preferably made scalable to handle a defined number of trunks fur a further local exchanges e.g. of a region comprising a plurality of local exchange areas.

In a further preferred embodiment, the softswitches provides an internet access to define and change specific subscriber information, e.g. to amend an above described black list or white list or to change the charging modalities.

What is claimed:

1. A communications network for a provision of an operator selection service for subscribers of a communications network, comprising:
    a single local exchange being operatively connected to a plurality subscriber terminals, the local exchange being operated by a first service provider, the local exchange including a plurality of ports that are formed in pairs by a plurality of connection loops, the local exchange of the first service provider being configured to,
    send an initial address message enabling call selection including an interconnection access identification defining a communication channel of an assigned one of the plurality of connection loops and an address of a calling subscriber and a called subscriber, wherein the called address is translated according to predefined rules into a physical address of a called terminal,
    receive a connection request message, and establish a connection on the defined communication channel of the assigned connection loop based on the connection request message, the assigned connection loop being associated with a second, service provider,
    no additional local exchanges being required to establish the connection on the defined communication channel.

2. A call server of a first service provider for a provision of an operator selection for subscribers of a communications network, with an interface to a signaling network of said communications network, wherein said call server of the first service provider is configured to receive on said interface an initial address message enabling call selection including an interconnection access identification defining a communication channel of an assigned connection loop of a single local exchange of a second service provider, and addresses of both a calling and a called subscriber, wherein the called address is translated according to predefined rules into a physical address of a called terminal, and to send a connection request message on said interface to establish a connection between terminals over the defined communication channel of the assigned connection loop based on said connection request message,
    the assigned connection loop being associated with the first service provider,
    no additional local exchanges being required to establish the connection between the terminals.

* * * * *